United States Patent

Vessel

[15] 3,664,131
[45] May 23, 1972

[54] HYBRID ROCKET FUEL AND PROCESS OF PROPULSION USING TETRAFORMALTRIAZINE

[72] Inventor: Eugene D. Vessel, Santa Clara, Calif.
[73] Assignee: United Aircraft Corporation, East Hartford, Conn.
[22] Filed: Feb. 1, 1966
[21] Appl. No.: 523,976

[52] U.S. Cl. .................................60/220, 149/19, 149/36, 60/219
[51] Int. Cl. ...........................................C06d 5/10
[58] Field of Search ..............60/219, 220; 149/36, 109, 18, 149/19, 20

[56] References Cited

UNITED STATES PATENTS

| 3,202,659 | 8/1965 | Wright | 149/36 X |
| 3,234,729 | 2/1966 | Altman et al. | 149/36 X |
| 3,244,702 | 4/1966 | Marcus | 260/241 |

*Primary Examiner*—Benjamin R. Padgett
*Attorney*—Steven F. Stone

[57] ABSTRACT

Tetraformal-tris-azine is a high energy fuel material suitable for use in hybrid rocket motors either as a compound per se or admixed with suitable binders.

4 Claims, No Drawings

HYBRID ROCKET FUEL AND PROCESS OF PROPULSION USING TETRAFORMALTRIAZINE

BACKGROUND OF THE INVENTION

This invention relates to hybrid fuel compositions and more particularly to tetraformal-tris-azine, hereinafter referred to as TFTA, as a primary hybrid fuel component.

As presently formulated, most hybrid fuels consist of an elastomeric binder containing various quantities of high energy ingredients, flame temperature modifiers, oxidizers and regression rate modifiers. These formulations comprised of various amounts of the above ingredients generally are tailored to produce a hybrid propellant grain which has a particular burning rate and flame temperature characteristic and a nonsustaining characteristic such that the combustion will stop when oxidizer flow is cut off.

Since it is generally desired to optimize the performance of a hybrid motor, it is preferable to employ as much of the high energy component as possible while keeping the binder, which is generally a fairly low energy material, to that minimum amount required to impart the desired physical properties to the grain. Much work is presently being done in the development of such high energy fuel components and at present, two of the most promising components are known to workers in the art as TAZ and THA. While both of these materials have high specific impulses, they are extremely expensive and exhibit impact sensitivity.

TFTA has been found to have a specific impulse comparable to that of hydrazine. For example, a TFTA-$N_2O_4$ system with an O/F ratio of 2, has a theoretical specific impulse of 283 seconds. In addition, TFTA is readily prepared from commercially available materials and therefore is substantially less expensive than TAZ or THA. TFTA is clean burning, has lower impact sensitivity than either TAZ or THA and is sensitive to variations in chamber pressure and oxidizer flow rate so that it is particularly useful in a throttleable hybrid system.

Accordingly, it is an object of this invention to provide a novel hybrid rocket fuel consisting of TFTA.

It is another object of this invention to employ TFTA as a component of a hybrid rocket fuel.

It is another object of this invention to provide a process for operating a hybrid rocket motor wherein TFTA is a fundamental fuel component.

It is another object of this invention to provide a smokeless hybrid rocket fuel.

These and other objects of the invention will be readily apparent from the following description.

DESCRIPTION OF THE INVENTION

TFTA has the following structural formula:

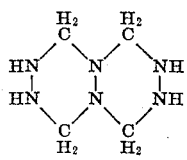

The material itself is readily prepared by reaction of formaldehyde and hydrazine as follows:

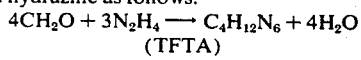

The synthesis of TFTA is reported in the following literature references: R. Stole, BER 40, 1,505, (1907) and K. Hauffman and D. Storm, BER 45, 1,728, (1912).

TFTA basically can be formed by reacting an aqueous solution of formaldehyde and hydrazine at room temperature. The solution is allowed to stand several days, the TFTA separates as white needles which can be readily recovered. TFTA has a heat of formation of +83.9 ± 1.5 K cal per mole and a heat of combustion equal to −6.033 ± 0.012 K calorie per gram as determined by oxygen bomb calorimetry. The melting point of TFTA is 245° C. and has a density of about 1.3 grams per cubic centimeter.

Impact sensitivity experiments indicate that TFTA is substantially less sensitive to impact than TAZ or THA. This feature enhances the attractiveness of using TFTA as a hybrid fuel material. TFTA can be used as the sole fuel component for a hybrid rocket grain or it can be used as an additive in hybrid rocket grains comprising elastomeric binders and one or more combustion modifiers. Suitable binders include polybutadiene polymers, particularly hydroxyl terminated polybutadienes cured with toluene diisocyanate for example, polyethers such as amine terminated polyethers cured with epoxy resins and silicone rubbers such as polydimethylsiloxane cured with an organometallic cure catalyst such as dibutyl tin dilaurate. If a grain is to be formulated by compacting TFTA, a particulate binding agent such as polyethylene or polypropylene can be incorporated into the grain to enhance the physical properties of compacted grains.

Suitable flame temperature modifiers include powdered metals such as aluminum, boron, magnesium and alkali metals. Other materials such as solid oxidizers, for example ammonium perchlorate and ammonium nitrate and various burning rate controlling agents such as iron oxide, chromic oxide and ferrocene compounds can also be employed as is well known in the propellant art in formulating the grain according to this invention.

TFTA can be employed as the sole ingredient of a hybrid rocket fuel grain, in which case, it is compacted into the form of the grain by pressing for example with or without a binding agent and then utilized in the hybrid motor. TFTA can be used as an additive with various of the above hybrid fuel components. In general, the amount of TFTA employed can vary from below one percent on up to the maximum amount that can be physically incorporated within the binder system under consideration. This maximum value varies with various binder systems and is not critical. The highest solid loading so far obtained is about 80 percent by volume, but this figure should not be construed as being the upper limit of usefulness of the material. It is expected that other binder systems will be developed that will permit higher solids loadings and as such is the case, even higher ranges of TFTA can be included in the systems. In any event, it is preferable to have more than 25 percent by volume of TFTA in the system.

The following examples are representative of the use of TFTA according to this invention:

EXAMPLE 1

487 grams of a 37 percent solution of formaldehyde in water was added dropwise to 200 grams of a 75 percent solution of hydrazine in water over a period of 4 ½ hours. The reaction mixture was kept at 50° C. Solid TFTA separated upon cooling of the mixture.

EXAMPLE 2

Powdered TFTA was compacted into a grain 6 inches long with an OD of 1.5 inches and port diameter of three-fourths inch. The grain was mounted in a casing and by employing a suitable igniter system was fired with oxygen as the oxidizer. The TFTA produced a clean burning, smoke free flame having a combustion chamber temperature of about 3,500° K. The grain did not sustain combustion upon shut off of oxidizer flow.

EXAMPLE 3

A hybrid fuel grain was formulated by mixing 45 weight percent TFTA with 55 percent of an hydroxyl terminated polybutadiene-toluene diisocyanate binder at 70° F. A propellant grain was cast and cured satisfactorily at 140° F. for 18 hours.

EXAMPLE 4

A propellant grain having the following formulation was satisfactorily cast and cured at 160° F. for 18 hours:

| | |
|---|---|
| Ammonium Perchlorate | 30% |
| TFTA | 25% |
| Aluminum Powder | 10% |

Hydroxyl Terminated Polybutadiene
cured with Toluene Diisocyanate          35%

EXAMPLE 5

The following composition was cast into a hollow hybrid grain 6 inches long and having a diameter of 0.75 inch.

| | |
|---|---|
| TFTA | 35% |
| Aluminum | 5% |
| Carbon Black | 1% |
| Hydroxyl Terminated Polybutadiene | 54.39% |
| Toluene Diisocyanate | 4.61% |

The grain was fired with oxygen for 2.57 seconds in a motor having a nozzle diameter of 0.250 inch. A chamber pressure of 1,000 psig was obtained and 33.18 grams of propellant was burned.

EXAMPLE 6

A suitable pelletized hybrid fuel system is represented by the following composition:

| Pellets | Matrix | Total | |
|---|---|---|---|
| 1.23% Polyethylene | 15.52% Hydroxyl Terminated Polybutadiene | 15.52% Hydroxyl Terminated Polybutadiene | |
| 1.23% Carbopol | | | |
| 14.79% Ammonium Perchlorate | 1.36% Toluene Diisocyanate | 1.36% Toluene Diisocyanate | 19.34% |
| 14.79% TFTA | 5.75% Ammonium Perchlorate | 1.23% Polyethylene | |

| | | | |
|---|---|---|---|
| 29.59% Boron | 14.58% TFTA | 1.23% Carbopol | |
| 61.64% | 1.15% Boron | 20.57% Ammonium Perchlorate | 80.66% |
| | 38.36% | 29.37% TFTA | |
| | | 30.75% Boron | |
| | | 100.00% | |

While this invention is described with respect to several specific examples thereof, the invention should not be construed as being limited thereto. Various modifications and substitutions can be made without departing from the scope of this invention which is limited only by the following claims:

I claim:

1. In a process for operating a hybrid gas generator which comprises combusting a solid fuel grain in a combustion chamber by means of a fluid oxidizer and exhausting the combustion products produced therein, the improvement wherein said grain comprises tetraformaltrisazine.

2. In a process for operating a hybrid rocket motor which comprises combusting a solid fuel grain in a combustion chamber by means of a fluid oxidizer and exhausting the combustion products produced through a thrust producing nozzle, the improvement wherein said grain comprises a compatible elastomeric binder and tetraformaltrisazine.

3. A hybrid rocket fuel grain comprising tetraformaltrisazine dispersed within a compatible polymeric binder.

4. The hybrid rocket grain of claim 3 wherein said tetraformaltrisazine is present in amounts above 25 percent by volume.

\* \* \* \* \*